US011293587B2

(12) United States Patent
Dal Ben et al.

(10) Patent No.: US 11,293,587 B2
(45) Date of Patent: Apr. 5, 2022

(54) SUPPORT DEVICE FOR VIDEO/PHOTOGRAPHIC EQUIPMENT

(71) Applicant: VITEC IMAGING SOLUTIONS S.P.A., Cassola (IT)

(72) Inventors: Sebastiano Dal Ben, Treviso (IT); Andrea Alessia De Amicis, Montesilvano (IT); Jacopo D'Agostini, Scurelle (IT); Fabio Facchinato, Arsie' (IT); Alessandro Motta, Costabissara (IT); Luca Passerini, Brentonico (IT); Mattia Scartezzini, Trento (IT); Mesfin Alemu Solomon, Trento (IT)

(73) Assignee: VITEC IMAGING SOLUTIONS S.P.A., Cassola (IT)

( * ) Notice: Subject to any disclaimer, the term of this patent is extended or adjusted under 35 U.S.C. 154(b) by 0 days.

(21) Appl. No.: 17/253,726

(22) PCT Filed: Jun. 19, 2019

(86) PCT No.: PCT/IB2019/055146
§ 371 (c)(1),
(2) Date: Dec. 18, 2020

(87) PCT Pub. No.: WO2020/003060
PCT Pub. Date: Jan. 2, 2020

(65) Prior Publication Data
US 2021/0190262 A1    Jun. 24, 2021

(30) Foreign Application Priority Data
Jun. 27, 2018    (IT) .................... 102018000006727

(51) Int. Cl.
*F16M 11/36*    (2006.01)
*F16M 11/28*    (2006.01)
*F16B 7/10*    (2006.01)

(52) U.S. Cl.
CPC ............ *F16M 11/36* (2013.01); *F16M 11/28* (2013.01); *F16B 7/105* (2013.01); *F16M 2200/027* (2013.01); *F16M 2200/08* (2013.01)

(58) Field of Classification Search
CPC .... F16M 11/36; F16M 11/28; F16M 2200/08; F16M 2200/027; F16B 7/105
(Continued)

(56) References Cited

U.S. PATENT DOCUMENTS 3,231,230 A * 1/1966 Mueller ................. F16M 11/28
248/449
4,621,785 A * 11/1986 Embra ................... F16M 11/28
248/565
(Continued)

FOREIGN PATENT DOCUMENTS

WO    2016131102 A1    8/2016

OTHER PUBLICATIONS

International Preliminary Report on Patentability in PCT/IB2019/055146, dated Jan. 7, 2021.

*Primary Examiner* — Muhammad Ijaz
(74) *Attorney, Agent, or Firm* — Volpe Koenig

(57) ABSTRACT

A support device (1; 100) for video/photographic equipment comprising at least one telescopic rod (2; 101) comprising: —a first tubular portion (10); —a second tubular portion (11) received inside the first tubular portion so as to be able to slide axially; —a third tubular portion (12) received inside the second tubular portion so as to be able to slide axially; —a first locking mechanism (14) arranged between said first tubular portion and the second tubular portion in order to lock the relative position of said first and second tubular portion in a desired position; —a second locking mechanism (20) arranged between said second tubular portion and the
(Continued)

third tubular portion in order to lock the relative position of the second and the third tubular portion in a desired position.

4 Claims, 2 Drawing Sheets

(58) Field of Classification Search
USPC .......................................................... 248/168
See application file for complete search history.

(56) References Cited

U.S. PATENT DOCUMENTS

| | | | |
|---|---|---|---|
| 6,027,087 A * | 2/2000 | Lindemann | A63C 11/221 |
| | | | 248/188.5 |
| 6,824,319 B1 | 11/2004 | Speggiorin | |
| 7,364,125 B2 | 4/2008 | Speggiorin | |
| 2013/0233988 A1 * | 9/2013 | Johnson | G03B 17/561 |
| | | | 248/229.14 |
| 2018/0031018 A1 * | 2/2018 | Muirhead | F16M 11/28 |
| 2019/0368637 A1 * | 12/2019 | Lai | F16B 7/105 |

\* cited by examiner

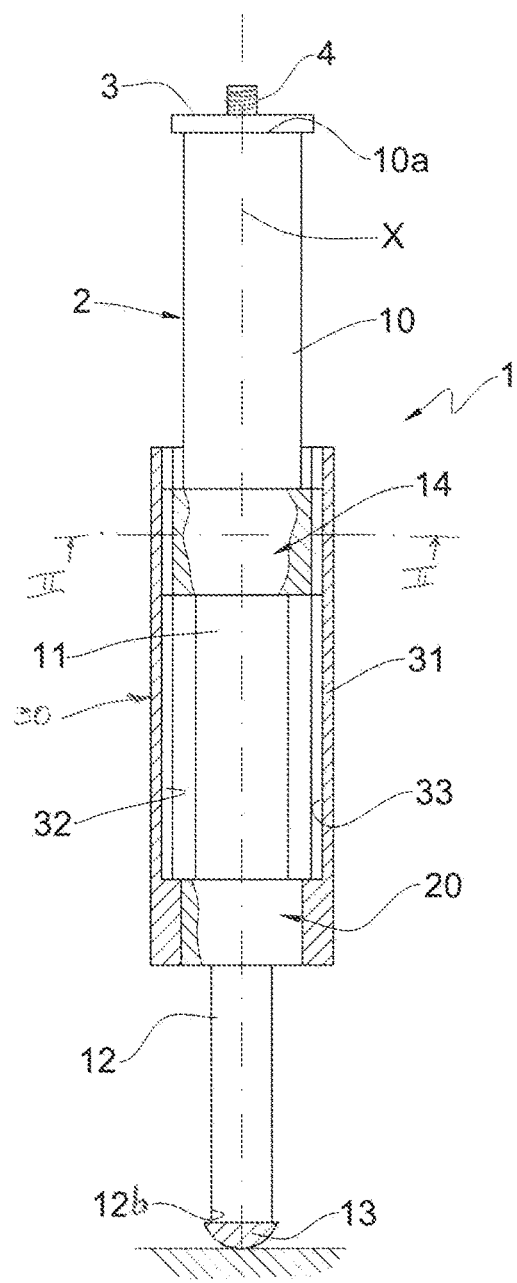
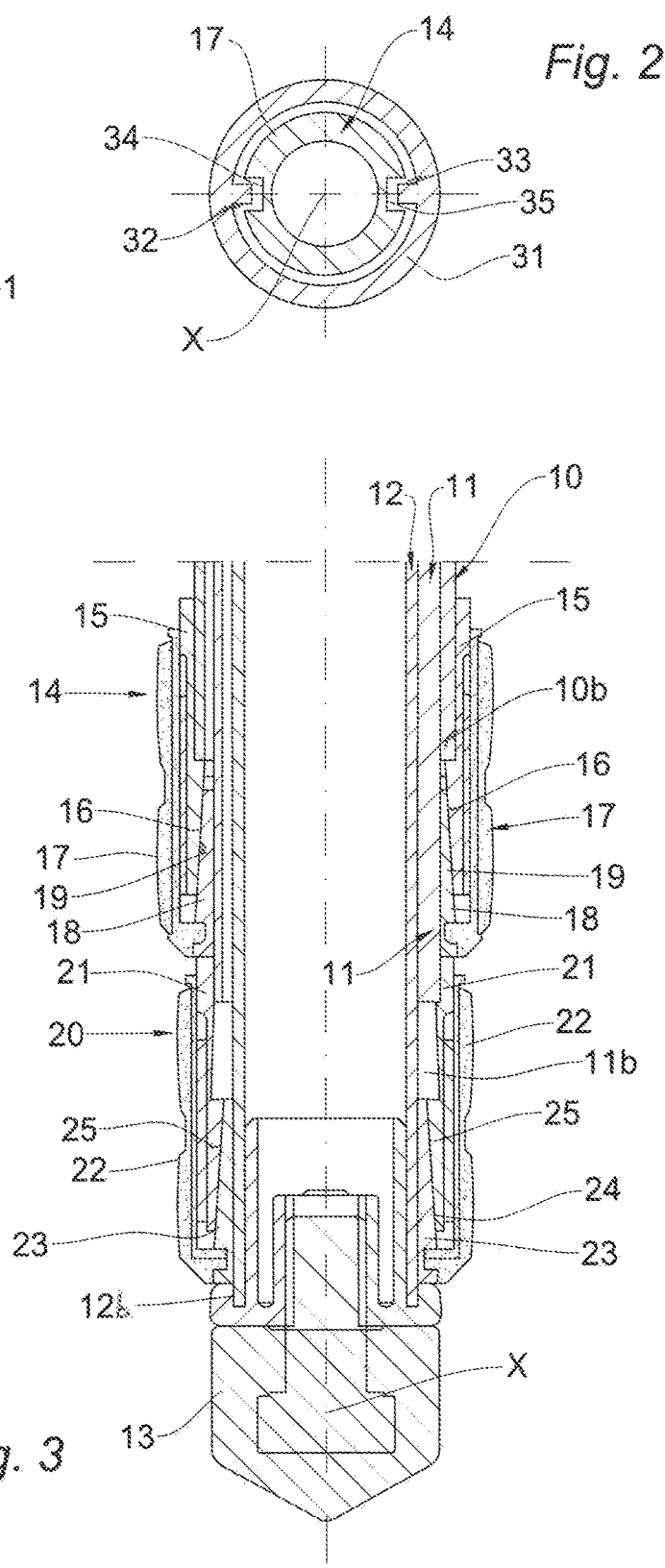
Fig. 1
Fig. 2
Fig. 3

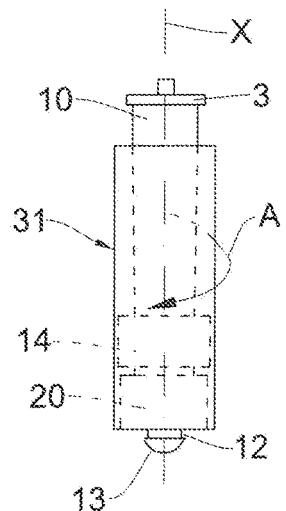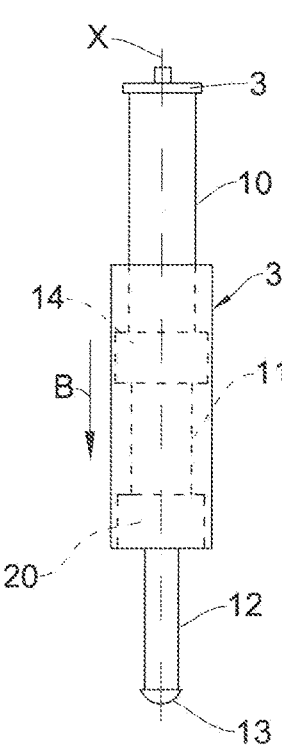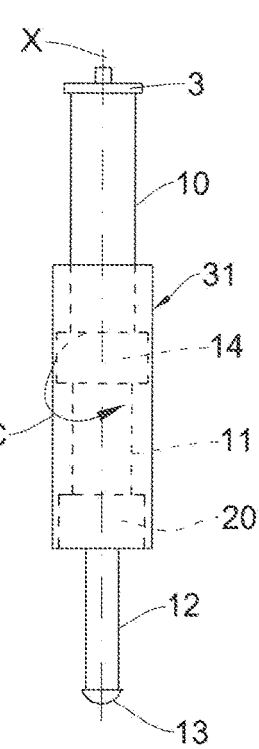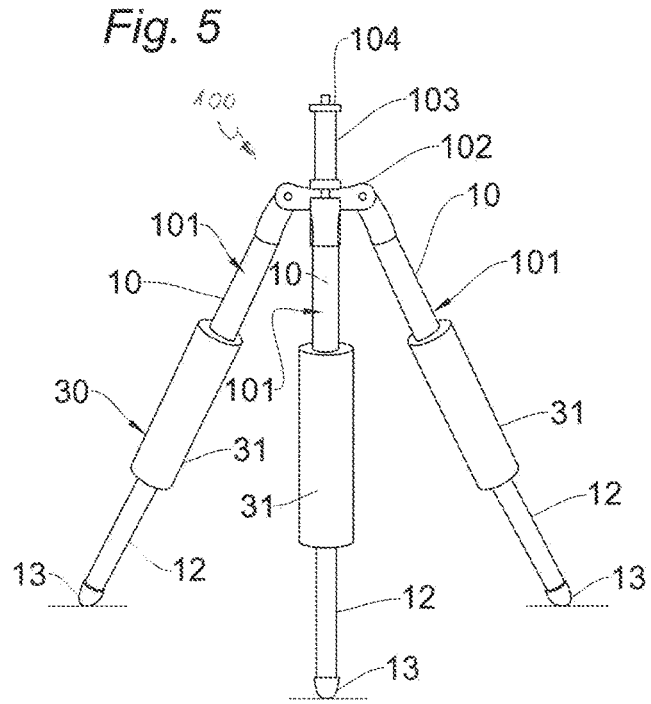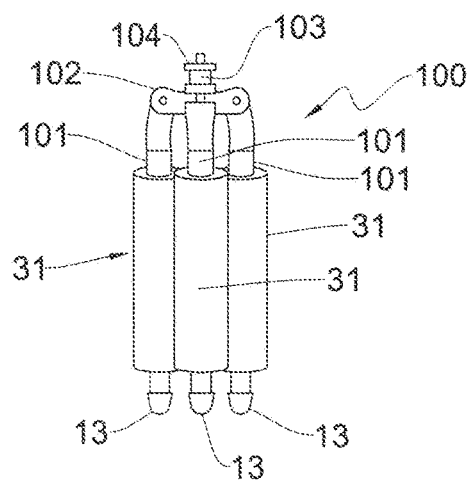

SUPPORT DEVICE FOR VIDEO/PHOTOGRAPHIC EQUIPMENT

TECHNICAL FIELD

The present invention relates to a support device for video/photographic equipment, having the features set out in the preamble of the main claim.

BACKGROUND ART

The use of support devices for video/photographic equipment is widely known in the technical field of photography, among which support devices those that are particularly common and appreciated, on both an amateur and a professional level, are tripods and monopods. These devices typically comprise one or more telescopic rods (three for tripods and one for monopods), each of which can be extended so as to be able to suitably support the video/photographic equipment in a set-up position, and can then be retracted in order to reduce the overall dimensions of the device to allow for easy transportation and storage of the device.

One telescopic rod used in the known support devices comprises a plurality of consecutive tubular portions, each portion being received so as to be engaged inside the next portion such that it can axially slide.

In this way, each tubular portion can be moved between a non-operating position, in which it is predominantly received inside the subsequent tubular portion, and an operating position, in which it is pulled out of the subsequent tubular portion such that a main portion thereof projects outside of said subsequent tubular portion.

The telescopic rod also comprises locking mechanisms, which are arranged between pairs of successive tubular portions and can lock and unlock the relative sliding motion between the tubular portions, thereby defining the desired relative position between said portions.

These locking mechanisms can be actuated individually so that each pair of successive tubular portions can be independently adjusted.

Examples of support devices comprising a plurality of telescopic rods such as that described above are described in U.S. Pat. No. 6,824,319 and in U.S. Pat. No. 7,364,125.

However, the support devices described above have some drawbacks, which include the fact that they are not always quick enough during set up and storage operations.

This feature is very desirable within this field, and the applicant therefore feels it necessary to improve this aspect of the known support devices of the type described above.

The applicant has first observed that the degree to which the provision of a separate locking means for each pair of successive tubular portions in one telescopic rod slows down the set up and storage operations of the support device is not negligible.

In fact, every time a telescopic rod has to be pulled out into the operating position, all the locking mechanisms have to be individually unlocked, the tubular portions pulled out to the desired length and lastly all the individual locking mechanisms have to be re-actuated in order to lock the respective tubular portions in position. In the same way, when the telescopic rod has to be moved back into the non-operating position, all the unlocking mechanisms have to be unlocked one by one, the tubular portions have to be inserted inside the next tubular portion and lastly all the individual locking mechanisms have to be re-actuated one by one.

WO 2016/131102 describes a tripod in which each leg is provided with a system that simultaneously locks and unlocks the different tubular portions comprising said system, which system comprises a plurality of telescopic rods inside the tubular portions, which are constrained in rotation to one another, made to rotate by a torsion spring and can be controlled so as to rotate by actuating or releasing respective locking means provided between adjacent tubular portions.

However, this system requires a kinematic chain having a plurality of transmissions and requires a plurality of components, which make the system complicated to produce, and which, above all, is not able to give the legs, and as a result the tripod, a sufficient amount of rigidity and stability.

It is pointed out how this feature is essential in this technical field and, in fact, distinguishes the level of quality of the products on the market.

DISCLOSURE OF THE INVENTION

The problem addressed by the present invention is that of providing a support device for video/photographic equipment, the structure and function of which is designed to overcome the drawbacks mentioned above with reference to the cited prior art.

Within the context of this problem, one object of the invention is to provide a support device that is simple to produce and that does not jeopardise the correct use of the support device by the user, in particular that is not excessively heavy or bulky.

This problem is solved and these objects are achieved by the present invention by means of a support device for video/photographic equipment that is formed in accordance with the following claims.

Therefore, in a first aspect thereof, the present invention is directed to a support device for video/photographic equipment, comprising at least one telescopic rod that can move between an extended state and a retracted state.

The telescopic rod preferably comprises:
 a first tubular portion;
 a second tubular portion received inside said first tubular portion so as to be able to slide axially;
 a third tubular portion received inside said second tubular portion so as to be able to slide axially;
 a first locking mechanism arranged between the first tubular portion and the second tubular portion in order to lock the relative position of said first and second tubular portion in a desired position;
 a second locking mechanism arranged between the second tubular portion and the third tubular portion in order to lock the relative position of the second and third tubular portion in a desired position.

The telescopic rod preferably also comprises a connecting element that extends between the first and the second locking mechanisms and is fastened to said mechanisms such that, by actuating the connecting element, the two locking mechanisms are actuated at the same time in order to lock or unlock the relative axial sliding of the tubular portions.

In this way, in a single action, both locking mechanisms can be controlled so as to be locked or unlocked such that all three tubular portions of the telescopic rod can be brought into a free sliding state or a mutual locking state.

This advantageously makes it possible to operate the support device, for example a monopod or a tripod, particularly rapidly when both opening and closing said device.

The connecting element preferably comprises a sleeve that extends externally around the first and the second locking mechanism.

In this way, the number of mechanical connections between the element operated by the user, in this case the outer sleeve, and the locking mechanism of the adjacent tubular portions is reduced to as few as possible.

In particular, the mechanical connections are reduced with respect to a locking system having internal rods, which requires, at the very least, a connection between an internal rod and an external actuating element (for example a button) that can be actuated by the user.

The applicant has in fact observed that each mechanical connection between different components is necessarily subjected to play caused by the dimensional tolerances of the components. The sum of this play leads to poor efficiency and poor stability of the locking action between the tubular portions.

Moreover, this disadvantage is even more pronounced in the mechanical systems in which the components that work under torsion have a reduced cross section. In fact, the torsional stiffness of a component having a reduced cross section is lower than that of a component having an enlarged cross section such that, when it is rotated about its own axis, it tends to twist, thereby only transmitting part of the rotary motion to the next component.

In contrast, the provision of an outer sleeve, which has a larger cross section than the tubular portions of the leg, makes the component very rigid and therefore able to effectively transmit the rotary motion about its own axis to the component connected thereto.

Furthermore, the provision of an outer sleeve makes it easier and straightforward to grip the control element and, as a result, to actuate it.

Furthermore, the outer sleeve can advantageously be used as a handle for transporting the tripod or the monopod.

Another advantage of the present invention is that the formation of a connecting element between the two locking mechanisms of the tubular portions of the leg that is on the outside of said locking mechanisms is much easier to produce than a system comprising rods that are on the inside of the tubular portions.

This advantageous feature has an immediate and visible effect on the costs of producing the leg, these costs being very reasonable for a system having an outer sleeve. Another significant consequence of this feature is that, by means of the system of the present invention that has an outer sleeve, legs can be used that comprise traditional mechanisms that comprise a ring for locking the tubular portions, which are in fact better at ensuring the rigidity of the locking action and therefore the stability of the tripod.

In this aspect, the support device according to the present invention can have at least one of the preferred features mentioned in the following.

Both the first and the second locking mechanism can preferably be actuated so as to lock or unlock by means of a rotation about an axis of the tubular portions.

Said locking mechanisms preferably comprise a corresponding ring, which is coaxial with respect to the tubular portions, is external thereto, rotates about its own axis and locks or unlocks the relative sliding between the tubular portions.

The connecting element is preferably constrained in rotation to the first and the second locking mechanism so as to be able to slide axially with respect to at least one of said mechanisms.

Thanks to this feature, the connecting element can simultaneously control both the locking mechanisms and, at the same time, does not prevent the second tubular portion from being able to freely slide with respect to the first or the third tubular portion. In this way, the three tubular portions of the telescopic rod can be fully pulled out and fully retracted.

The sleeve is preferably integral, for both conjoint rotation and conjoint translation, with the second locking mechanism.

A groove that extends axially is preferably made on one out of the sleeve and the first locking mechanism and a projection is provided on the other one out of the sleeve and the first locking mechanism, which projection projects radially and engages in the groove in order to prevent the sleeve and the first locking mechanism from rotating relative to one another and, at the same time, to allow the sleeve to slide axially with respect to the first locking mechanism.

Of course, the support device can analogously provide a reverse configuration, in which the coupling between the sleeve and the first locking mechanism is integral for conjoint rotation and conjoint translation and the coupling between the sleeve and the second locking mechanism is integral for conjoint rotation and is free in terms of axial translation.

BRIEF DESCRIPTION OF THE DRAWINGS

The features and advantages of the invention will become clearer from the detailed description of a few preferred embodiments thereof, which are illustrated by way of non-limiting example, and with reference to the accompanying drawings, in which:

FIG. 1 is a schematic view of a partial axial section of a first example of a support device for video/photographic equipment, which is formed according to the present invention, in an extended state (operating position);

FIG. 2 is a partial schematic view of a cross section of the support device in FIG. 1 along the line II-II;

FIG. 3 is a schematic view of an axial section of an enlarged portion of the support device in FIG. 1, in a retracted state (non-operating position), deprived of the connecting element;

FIG. 4a-4c are schematic views of the support device in FIG. 1 in various configurations;

FIG. 5 is a schematic perspective view of a second example of the support device for video/photographic equipment, which is formed in accordance with the present invention, in the extended state (operating position); and FIG. 6 is a schematic perspective view of the support device in FIG. 5 in the retracted state (non-operating position).

PREFERRED EMBODIMENTS OF THE INVENTION

With initial reference to FIGS. 1 to 4c, 1 represents a first example of a support device for video/photographic equipment as a whole, formed in accordance with the present invention.

The support device 1 is a monopod and comprises a telescopic rod 2, at the top of which a plate 3 is arranged that is provided with an attachment element 4, for example a ⅜ inch screw, which is provided for fixing video/photographic equipment, which is conventional per se and is not shown in the attached figures, to the monopod 1.

The telescopic rod 2 comprises a first tubular portion 10, a second tubular portion 11, which is received inside the first tubular portion 10 such that it can axially slide, and a third tubular portion 12, which is received inside the second tubular portion 11 such that it can axially slide.

The three tubular portions 10, 11 and 12 are coaxial with respect to one another, having a main longitudinal dimension that extends along their common X axis and a transverse dimension so as to allow the third tubular portion 12 to slidingly engage in the second tubular portion 11 and to allow the second tubular portion to slidingly engage in the first tubular portion 10.

The plate 3 is preferably fixed to a first free end 10a of the first tubular portion 10, while a small foot 13, for example a small rubber foot, which can be used so that the monopod 1 is stably supported on the ground, is fixed to the free end 12b of the third tubular portion 12.

In order to lock the first tubular portion 10 and the second tubular portion 11 in a desired position or to allow them to slide relative to one another, a first locking mechanism 14 is provided between said tubular portions.

The first locking mechanism 14 comprises a collar 15, which is fixed to a second end 10b of the first tubular portion 10 that is opposite the first end 10a. A conical surface 16 is defined on the collar 15, extends away from the second end 10b, and has a profile that has a diameter that gradually increases as said surface extends away from the second end 10b.

The first locking mechanism 14 also comprises a ring 17, which is screwed onto an external thread of the collar 15. In this way, by rotating the ring 17 about the X axis, it is axially moved from and towards the second end 10b of the first tubular portion 10.

A locking element 18, which is also provided with a conical surface 19, is coupled to the ring 17 and is arranged between the conical surface 16 of the collar 15 and the outer surface of the second tubular portion 11.

In this way, when the locking element 18 is moved towards the second end 10b by the action of screwing the ring 17 onto the collar 15, said locking element is pushed against the second tubular portion 11 as a result of the relative sliding between the conical surfaces 16 and 19, thereby locking the relative axial sliding thereof inside the first tubular portion 10.

In order to unlock the second tubular portion 11, it is sufficient to rotate the ring 17 in the opposite direction in order to move the locking element 18 away from the second end 10b.

A second locking mechanism 20 is also provided between the second tubular portion 11 and the third tubular portion 12. Said second locking mechanism is substantially identical to the first locking mechanism 14, and therefore the features described above in relation to the first locking mechanism 14 can also directly relate to the second locking mechanism 20, in which the first and the second tubular portions 10, 11 are replaced by the second and the third tubular portions 11, 12, respectively.

Therefore, the second locking mechanism 20 comprises a collar 21 that is fixed to the second end 11b of the second tubular portion 11, a ring 22 that is screwed to the outside of the collar 21, and a locking element 23 that is coupled to the ring 22 and is provided with a conical surface 24 arranged between the third tubular portion 12 and a corresponding conical surface 25 of the collar 21.

The telescopic rod 2 also comprises a connecting element 30, which extends between the first and the second locking mechanism 14 and 20.

The connecting element 30 comprises a sleeve 31 that is integrally fixed to the outside of the ring 22.

The sleeve 31 also comprises a pair of projections 32, 33 that extend from the internal wall of the sleeve 31 on diametrically opposing sides. Each projection 32, 33 extends in the axial direction, substantially for the entire axial extension of the sleeve 31, the size of which is equal to or slightly greater than the spacing between the first and the second mechanism 14, 20 when the second tubular portion 11 is in an extended position with respect to the first tubular portion 11.

A pair of grooves 34 and 35 is also made on diametrically opposing sides of the ring 17, in each of which respective projections 32, 33 are slidingly engaged.

In this way, the sleeve 31 is integral with the ring 22 of the second locking mechanism 20 for conjoint rotation and translation, while being integral with the ring 17 of the first locking mechanism 14 for conjoint rotation but being able to freely axially slide relative thereto.

The sleeve 31 is preferably covered with a soft material such that it is comfortable for the user to grip.

In FIG. 3, the connecting element 30 has been omitted from the representation in order to improve the clarity of the illustration of the locking mechanisms 14 and 20.

The support device 1 is used as follows.

In FIG. 4a, the support device 1 is shown in the non-operating position that is in its retracted state, in which the third tubular portion 12 is almost completely housed inside the second tubular portion 11, which, in turn, is almost completely housed inside the first tubular portion 10. Both the first and the second locking mechanism 14, 20 are tightened so as to prevent the different tubular portions from sliding axially relative to one another.

In order to extend the support device 1 and to move it into its operating position, for example to position it in order to record a video or take a picture, it is sufficient to hold onto the sleeve 31 and to rotate it about the X axis (arrow A in FIG. 4a).

In this way, on account of the projections 32, 33 engaging with the grooves 34, 35 and being fixed to the ring 22, both the ring 17 and the ring 22 are simultaneously made to rotate. In this way, both the locking mechanisms 14, 20 are unlocked and the tubular portions 11 and 12 are released and can freely slide with respect to the tubular portions 10 and 11 in the axial direction, thereby leaving said portions (FIG. 4b, arrow B).

When the tubular portions 11 and 12 have completely left said portions, or have left them to the desired extent, the sleeve 31 is rotated in the opposite direction (arrow C in FIG. 4c) so as to simultaneously actuate the first and the second locking mechanism 14 and 20 in order to lock the relative sliding of the tubular portions (FIG. 4c).

At this point, the support device 1 is locked in the extended state.

In order to move the support device 1 back into the retracted state, it is sufficient to reverse the steps indicated above.

FIGS. 5 and 6 show a second embodiment of the support device for video/photographic equipment according to the present invention.

In this case, the support device is a tripod 100. The tripod comprises three telescopic rods 101, which are hinged at one end thereof to a cross-brace 102, inside which a column 103 is axially engaged, at the top of which column a plate 104 is arranged for fixing video/photographic equipment.

All of the telescopic rods 101 are similar to the telescopic rod 2 of the monopod 1 shown in the previous example and the components thereof are identified in the following by the same reference numerals.

Therefore, each rod 101 comprises a first tubular portion 10, a second tubular portion 11, which is received inside the first tubular portion 10 such that it can axially slide, and a third tubular portion 12, which is received inside the second tubular portion 11 such that it can axially slide, as well as a first and a second locking mechanism 14 and 20, which are arranged between the first and the second tubular portion 10, 11 and between the second and the third tubular portion 11 and 12, respectively.

A connecting element 30 also extends between the first and the second locking mechanism 14 and 20 and comprises a sleeve 31 that is integrally fixed to the outside of a ring of the second locking mechanism 20 and engages with a ring of the first locking mechanism 14 by means of a coupling that links their mutual rotation, thereby allowing them to slide axially with respect to one another.

The transition from the operating position (shown in FIG. 5), in which the telescopic rods 101 are in the extended state, to the non-operating position, in which the telescopic rods 101 are in the retracted state (shown in FIG. 6) of the tripod 100, is similar to that described previously in relation to the monopod 1.

It shall be appreciated that, in this case, the advantage in terms of the speed with which the tripod transitions between the different operating positions is even greater because on the sleeves 31 only 3 rotations in one direction and 3 rotations in the opposite direction, for example, are necessary to unlock all the rods 101, move them into the desired position and lock them in this position, whereas in traditional tripods 12 actuations of the individual locking mechanisms are required.

Furthermore, the increased axial extension of the sleeve 31 allows the user to rotate the sleeve 31 into a position that is higher off the ground and is therefore generally more convenient.

The present invention therefore solves the problem described above with reference to the cited prior art, while offering several other advantages.

Of course, for the purpose of satisfying specific and contingent requirements of the application, a person skilled in the art will be able to bring further modifications and variants to the invention described above, which still fall within the scope of protection as defined by the following claims.

The invention claimed is:

1. Support device (1; 100) for at least one of video or photographic equipment, comprising at least one telescopic rod (2; 101) that can be moved between an extended position and a retracted position, said telescopic rod comprising:

a first tubular portion (10);

a second tubular portion (11) received inside said first tubular portion (10) so as to be able to slide axially;

a third tubular portion (12) received inside said second tubular portion (11) so as to be able to slide axially;

a first locking mechanism (14) arranged between said first tubular portion (10) and said second tubular portion (11) in order to lock a relative position of said second tubular portion with respect to said first tubular portion in a desired position;

a second locking mechanism (20) arranged between said second tubular portion (11) and said third tubular portion (12) in order to lock a relative position of said third tubular portion with respect to said second tubular portion in a desired position;

a connecting element (30) that receives and extends between said first and said second locking mechanisms (14, 20) and is fastened to the first and second locking mechanisms such that, by actuating said connecting element (30), said first and second locking mechanisms (14, 20) are simultaneously actuated in order to lock or unlock the axial sliding sliding of said first, second and third tubular portions (10, 11, 12);

wherein said connecting element (30) comprises a sleeve (31) that extends externally around said first and second locking mechanisms (14, 20).

2. Support device according to claim 1, wherein each of said first and second locking mechanisms (14, 20) is actuated by a rotation about an axis (X) of said second tubular portion (12), and said connecting element (30) is constrained in rotation to said first and to said second locking mechanism (14, 20) so as to be able to slide axially with respect to at least one of said first or second locking mechanisms (14, 20).

3. Support device according to claim 1, wherein said sleeve (31) is integral with one of said first or second locking mechanisms (14, 20).

4. Support device according to claim 3, wherein at least one groove (34, 35), which extends axially, is provided in one of said sleeve (31) or said first or second locking mechanisms (14, 20), and at least one radial projection (32, 33) is provided on the other of said sleeve (31) or said first or second locking mechanisms (14, 20), wherein said projection engaged in said at least one groove, preventing a relative rotation of said sleeve (31) and said first or second locking mechanism (14, 20) and, at the same time, allowing said sleeve (31) to slide axially with respect to said first or second locking mechanism (14, 20).

* * * * *

UNITED STATES PATENT AND TRADEMARK OFFICE
CERTIFICATE OF CORRECTION

PATENT NO. : 11,293,587 B2
APPLICATION NO. : 17/253726
DATED : April 5, 2022
INVENTOR(S) : Dal Ben et al.

It is certified that error appears in the above-identified patent and that said Letters Patent is hereby corrected as shown below:

In the Claims

In Claim 1, at Column 8, Line 22, after the word "axial", delete one of the words "sliding", therefor.

Signed and Sealed this
Seventeenth Day of May, 2022

Katherine Kelly Vidal
*Director of the United States Patent and Trademark Office*